United States Patent
Matsukiyo et al.

(10) Patent No.: US 10,816,271 B2
(45) Date of Patent: Oct. 27, 2020

(54) HEAT EXCHANGER AND ABSORPTION REFRIGERATOR

(71) Applicant: Yazaki Energy System Corporation, Tokyo (JP)

(72) Inventors: Tomiyuki Matsukiyo, Hamamatsu (JP); Takahide Sugiyama, Hamamatsu (JP); Osamu Hiyama, Hamamatsu (JP); Syungo Saito, Hamamatsu (JP); Jun Kuroda, Hamamatsu (JP)

(73) Assignee: YAZAKI ENERGY SYSTEM CORPORATION, Minato-ku, Tokyo (JP)

( * ) Notice: Subject to any disclaimer, the term of this patent is extended or adjusted under 35 U.S.C. 154(b) by 117 days.

(21) Appl. No.: 16/179,411

(22) Filed: Nov. 2, 2018

(65) Prior Publication Data
US 2019/0162477 A1 May 30, 2019

(30) Foreign Application Priority Data
Nov. 24, 2017 (JP) .................. 2017-225397

(51) Int. Cl.
*F28D 7/08* (2006.01)
*F28D 1/04* (2006.01)
(Continued)

(52) U.S. Cl.
CPC .............. *F28D 7/085* (2013.01); *F25B 15/00* (2013.01); *F25B 15/06* (2013.01); *F28D 1/0426* (2013.01); *F28D 1/0477* (2013.01); *F28D 7/0083* (2013.01); *F28D 9/0093* (2013.01); *F25B 37/00* (2013.01); *F25B 39/02* (2013.01); *F25B 39/04* (2013.01); *F28F 2250/104* (2013.01)

(58) Field of Classification Search
CPC ...... F28D 7/085; F28D 1/0426; F28D 1/0477; F28D 7/0083; F28D 9/0093; F28D 5/02; F25B 15/00; F25B 15/06; F25B 39/04; F25B 37/00; F25B 39/02; F28F 2250/104
USPC .......................................... 62/485
See application file for complete search history.

(56) References Cited

U.S. PATENT DOCUMENTS 3,866,439 A * 2/1975 Bussjager ............... F25B 39/02
62/504
2005/0006064 A1 1/2005 Garimella
2017/0153046 A1* 6/2017 Izquierdo Millan .... F25B 33/00

FOREIGN PATENT DOCUMENTS

CN     105402928 A   3/2016
EP     0 728 508 A1  8/1996
(Continued)

*Primary Examiner* — Steve S Tanenbaum
(74) *Attorney, Agent, or Firm* — Sughrue Mion, PLLC

(57) ABSTRACT

A heat exchanger includes: a first heat transfer tube unit including first heat transfer tubes arranged in parallel along a first direction within a horizontal plane; and a second heat transfer tube unit including second heat transfer tubes arranged in parallel with one another along a second direction that intersects the first direction within the horizontal plane. Each of the first heat transfer tubes and the second heat transfer tubes includes: straight portions arranged in parallel in a vertical direction; and one or more curved portions that make end portions of the straight portions communicate with each other. The straight portions of the first heat transfer tube unit and the straight portions of the first heat transfer tube unit are stacked on each other alternately.

4 Claims, 3 Drawing Sheets

(51) Int. Cl.
  *F25B 15/00* (2006.01)
  *F25B 15/06* (2006.01)
  *F28D 1/047* (2006.01)
  *F28D 7/00* (2006.01)
  *F28D 9/00* (2006.01)
  F25B 39/04 (2006.01)
  F25B 37/00 (2006.01)
  F25B 39/02 (2006.01)
  F28D 5/02 (2006.01)

(56) References Cited

FOREIGN PATENT DOCUMENTS

| JP | 2003-254679 A | 9/2003 |
| JP | 2003-254682 A | 9/2003 |
| JP | 2003-254683 A | 9/2003 |

\* cited by examiner

HEAT EXCHANGER AND ABSORPTION REFRIGERATOR

CROSS-REFERENCES TO RELATED APPLICATIONS

This application is based on and claims priority from Japanese Patent Application No. 2017-225397 filed on Nov. 24, 2017, the entire contents of which are incorporated herein by reference.

FIELD

One or more embodiments of the present invention relate to a heat exchanger and an absorption refrigerator.

BACKGROUND

There have conventionally been known absorption refrigerators in which a liquid refrigerant is obtained through a recirculation cycle realized by an evaporator, an absorber, a generator and a condenser for use in outside equipment. For example, JP-A-2003-254679, JP-A-2003-254682 and JP-A-2003-254683 disclose a construction of a heat exchanger configured to transfer heat between a first fluid on peripheries of heat transfer tubes and a second fluid in interiors of the heat transfer tubes. This heat exchanger is formed by arranging a plurality of heat transfer tube units in parallel with one another along a horizontal direction. The heat transfer tube units each include a plurality of heat transfer tubes that are stacked closely one on another in a vertical direction with no gap provided between the heat transfer tubes. According to this configuration, liquid pools are formed at portions where the heat transfer tubes are in contact with each other, whereby a uniform thin film condition of liquid can be formed on outer surfaces of the heat transfer tubes. This can improve the wetting properties of the heat transfer tubes, whereby the high-performance heat exchanger can be obtained. Additionally, eliminating vertical gaps between the heat transfer tubes can help to reduce the volume of the heat exchanger, whereby a reduction in size of the heat exchanger can be realized.

SUMMARY

According to the heat exchangers described in JP-A-2003-254679, JP-A-2003-254682 and JP-A-2003-254683, however, the following problems are caused.

Firstly, although the heat transfer tubes that lie adjacent to each other in the vertical direction are in contact with each other, the heat transfer tubes that lie adjacent to each other in the horizontal direction are left spaced apart from each other. Consequently, in a case where the first fluid is not supplied in balance from a liquid spraying device to the individual heat transfer tubes arranged in the horizontal direction, the respective performances of the heat transfer tubes differ from one another. Thus, the heat exchanger cannot exhibit its performance as a whole.

Further, in a case where the heat transfer tubes are brought into contact with each other in the vertical direction, the heat transfer tube units constitute a wall-like structure. This prevents a flow of the fluid (the gaseous fluid) in a direction that intersects the heat transfer tube units. As a result of this, the vapor (the gaseous fluid) is allowed to flow only in the vertical direction, and this increases a pressure loss, leading to a possibility of calling for a reduction in performance of the heat exchanger.

Next, a diameter of each heat transfer tube is reduced in a multiplicity of steps so that diameters of portions of the heat transfer tube that connect to headers become smaller than those of the other portions. This increases a pressure loss of the second fluid that flows in the interior of the heat transfer tube. As a result of this, the power needed to carry the fluid is increased, leading to an increase in energy consumption.

In addition, in a case where the heat transfer tubes that make up the heat transfer tube unit have different lengths, flow rates of the fluid flowing in the interiors of the heat transfer tubes become different from one heat transfer tube to another. Specifically speaking, in one heat transfer tube having a smaller outer surface, that is, with one heat transfer tube having a shorter overall length, the second fluid flows more, while in another heat transfer tube having a greater outer surface, that is, in another heat transfer tube having a longer overall length, the second fluid flows less. This causes an unbalanced flow of the second fluid in the heat transfer tubes.

One or more embodiments of the invention have been made in view of the above-described circumstances, and an object thereof is to provide a small and high-performance heat exchanger and a small and high-performance absorption refrigerator including such a heat exchanger.

In a first aspect of the invention, there is provided a heat exchanger configured to transfer heat between a first fluid on a periphery of a heat transfer tube and a second fluid in an interior of the heat transfer tube. The heat exchanger according to the first aspect of the invention includes: a first heat transfer tube unit including a plurality of first teat transfer tubes arranged in parallel with one another along a first direction within a horizontal plane; and a second heat transfer tube unit including a plurality of second heat transfer tubes arranged in parallel with one another along a second direction that intersects the first direction within the horizontal plane. In this case, each of the plurality of first heat transfer tubes includes: a plurality of first straight portions arranged in parallel with and spaced from one another in a vertical direction; and one or more first curved portions that make end portions of the first straight portions communicate with each other, and the plurality of first heat transfer tubes form one flow path from an inlet header to an outlet header. Each of the plurality of second heat transfer tubes includes: a plurality of second straight portions arranged in parallel with spaced from one another in the vertical direction; and one or more second curved portions that make end portions of the second straight portions communicate with each other, and the plurality of second heat transfer tubes form one flow path from the inlet header to the outlet header. The first straight portions and the second straight portions are stacked on each other alternately.

In the first aspect of the invention, the plurality of first heat transfer tubes may be arranged in parallel with and spaced from one another in the first direction, and the second heat transfer tubes may be arranged in parallel with and spaced from one another in the second direction.

In the first aspect of the invention, the first curved portion may have a radius of curvature corresponding to an outside diameter of the second straight portion, and the second curved portion may have a radius of curvature corresponding to an outside diameter of the first curved portion.

In a second aspect of the invention, there is provided an absorption refrigerator including: a generator configured to heat a diluted solution to generate a refrigerant vapor and a condensed solution; a condenser configured to condense the refrigerant vapor generated in the generator; an evaporator configured to receive a refrigerant solution condensed in the condenser and evaporate the refrigerant solution; and an absorber configured to make a refrigerant vapor generated by evaporation in the evaporator be absorbed into the condensed solution generated in the generator to generate the diluted solution, wherein the absorption refrigerator forms an absorption refrigerating cycle of sending the diluted solution generated in the absorber to the generator, and wherein the heat exchanger according to the first aspect of the invention is disposed in at least one of the generator, the condenser, the evaporator and the absorber.

According to one or more embodiments of the invention, the heat transfer tubes are disposed closely or almost closely and neatly in the vertical direction so as to be packed together, while the spaces are provided between the heat transfer tubes in the horizontal direction, whereby the flow of the gaseous fluid is not interrupted. This can provide the small and high-performance heat exchanger and the small and high-performance absorption refrigerator including this heat exchanger.

DETAILED DESCRIPTION

Figure 1:
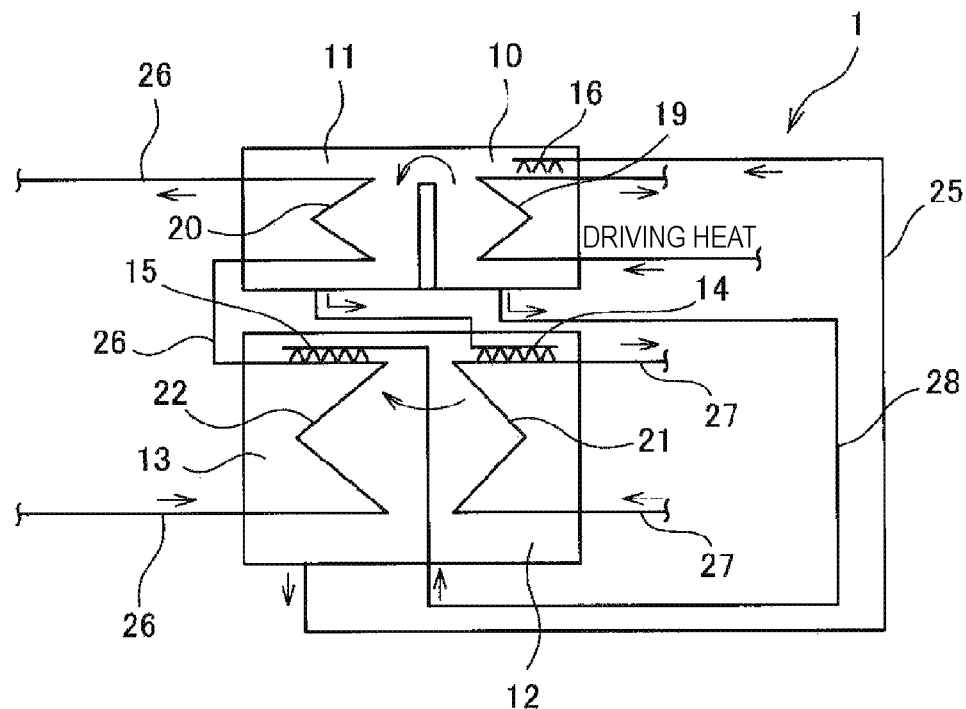
FIG. 1 is a block diagram of a single-effect water-fired absorption refrigerator as a simplest absorption refrigerator according an embodiment.

FIG. 1 is a block diagram of a single-effect water-fired absorption refrigerator as a simplest absorption refrigerator 1 according an embodiment. An absorption refrigerator 1 includes a generator 10, a condenser 11, an evaporator 12 and an absorber 13 and cools a refrigerant solution (for example, water) by an absorption refrigerating system realized by the generator 10, the condenser 11, the evaporator 12 and the absorber 13. Additionally, the absorption refrigerator 1 includes a regenerative heat exchanger 19, a condensing heat exchanger 20, an evaporative heat exchanger 21 and an absorption heat exchanger 22.

The generator 10 heats a diluted solution (a solution in which the concentration of an absorbing solution is low) that is a mixture of a refrigerant (for example, water) and bromide lithium (LiBr) that constitutes an absorbing solution. Hereinafter, a vaporized refrigerant will be referred to as a "refrigerant vapor," and a liquefied refrigerant will be referred to as a "refrigerant solution." A diluted solution is supplied from the absorber 13 to the generator 10 by way of a diluted solution piping 25 by a diluted solution distributor 16 (an example of a solution spraying device) configured to drip (spray) the diluted solution. A thermal medium, which constitutes driving heat, is supplied from a thermal source (not shown) to the generator 10. A diluted solution dripped on the regenerative heat exchanger 19 by the diluted solution distributor 16 is heated by the thermal medium flowing in an interior of the regenerative heat exchanger 19. The generator 10 generates a refrigerant vapor and a condensed solution (a solution in which the concentration of an absorbing solution is high) by evaporating the diluted solution by heating. The generated refrigerant vapor is supplied into the condenser 11.

The condenser 11 liquefies (condenses) the refrigerant vapor supplied from the generator 10. Cooling water cooled in a cooling tower is supplied into an interior of the condenser 11 by way of a cooling water piping 26. The refrigerant vapor supplied from the generator 10 is caused to condense by the cooling water flowing through an interior of the condensing heat exchanger 20, and a refrigerant solution resulting from condensation flows down an outer surface (that is, a periphery) of the condensing heat exchanger 20. The refrigerant solution resulting from condensation flows down the outer surface of the condensing heat exchanger 20 and is then collected for supply to the evaporator 12.

The evaporator 12 takes in the refrigerant solution resulting from condensation in the condenser 11 and evaporates the refrigerant solution. A refrigerant distributor 14 (an example of a spraying device) configured to drip (spray) the refrigerant solution from the condenser 11. The evaporative heat exchanger 21 is provided within the evaporator 12. The chilled water (chilled solution) that is warmed as a result of interior equipment cooling interior air is supplied to this evaporative heat exchanger 21. A chilled water piping 27 is connected to the evaporative heat exchanger 21 so that chilled water can be circulated between the evaporative heat exchanger 21 and the interior equipment.

A vacuum state is produced within the evaporator 12. Due to this, an evaporation temperature of water that is a refrigerant is about 5° C. Thus, the refrigerant solution dripped on the evaporative heat exchanger 21 by the refrigerant distributor 14 is heated by the chilled water to be evaporated. Refrigerant vapor resulting from evaporation is supplied to the absorber 13. On the other hand, chilled water flowing in the interior of the evaporative heat exchanger 21 is deprived of heat by evaporation of the refrigerant solution. This cools the chilled water flowing through the interior of the evaporative heat exchanger 21 and is then supplied into the interior equipment. Then, the interior equipment supplies chilled air into an interior of a room by making use of the chilled water.

The absorber 13 absorbs the refrigerant vapor supplied from the evaporator 12. The condensed solution is supplied from the generator 10 to the absorber 13 by way of a condensed solution piping 28. In the absorber 13, the refrigerant vapor is absorbed by the condensed solution to generate a diluted solution.

A condensed solution distributor 15 (an example of a solution spraying device) configured to drip (spray) a condensed solution is provided within the absorber 13. The absorption heat exchanger 22 is provided within the absorber 13. Cooling water cooled in the cooling tower is supplied to the absorption heat exchanger 22.

The condensed solution dripped on the absorption heat exchanger 22 by the condensed solution distributor 15 absorbs the refrigerant vapor while flowing on an outer surface of the absorption heat exchanger 22. Absorption heat generated by absorption of the refrigerant vapor by the condensed solution is removed by the cooling water flowing in an interior of the absorption heat exchanger 22. A diluted solution of a low concentration produced by absorption of the refrigerant vapor by the condensed solution is supplied into the generator 10 by way of the diluted solution piping 25.

This embodiment adopts the configuration in which cooling water in the cooling tower is shared by the condensing heat exchanger 20 of the condenser 11 and the absorption heat exchanger 22 of the absorber 13, and hence, the condensing heat exchanger 20 and the absorption heat exchanger 22 are connected in series to the cooling tower. However, the condensing heat exchanger 20 and the absorption heat exchanger 22 may be connected to the cooling tower in parallel. Additionally, although the absorption refrigerator of this embodiment is described as being the single-effect one, the configuration of the absorption refrigerator that has been described heretofore may be similarly true in relation to a double-effect absorption refrigerator or a double-lift one.

Figure 2:
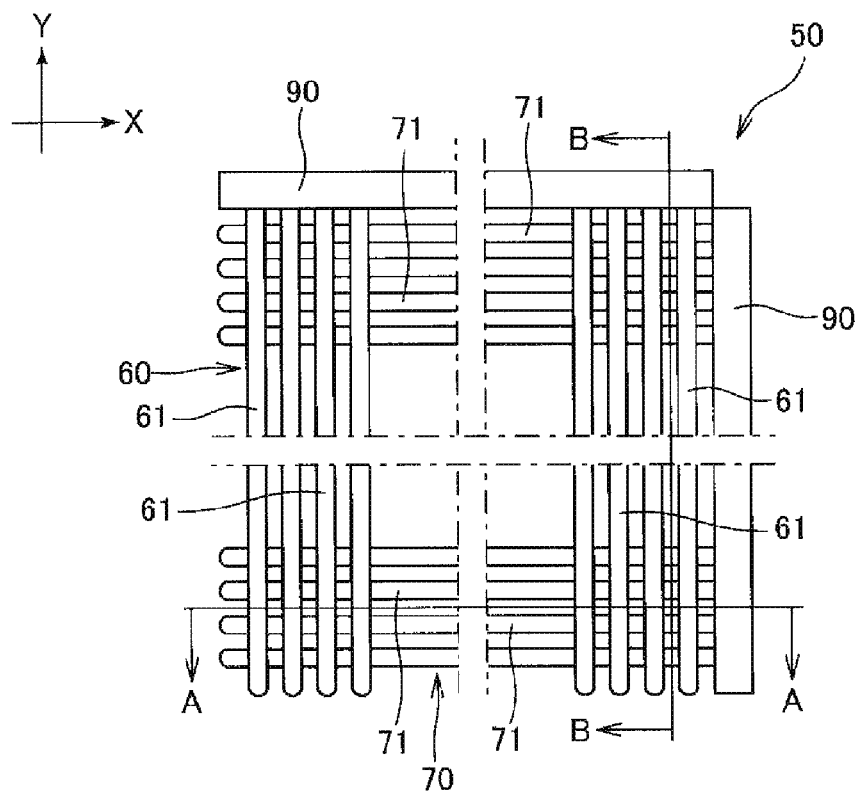
FIG. 2 is a plan view illustrating schematically the configuration of a heat exchanger according to the embodiment.
Figure 3:
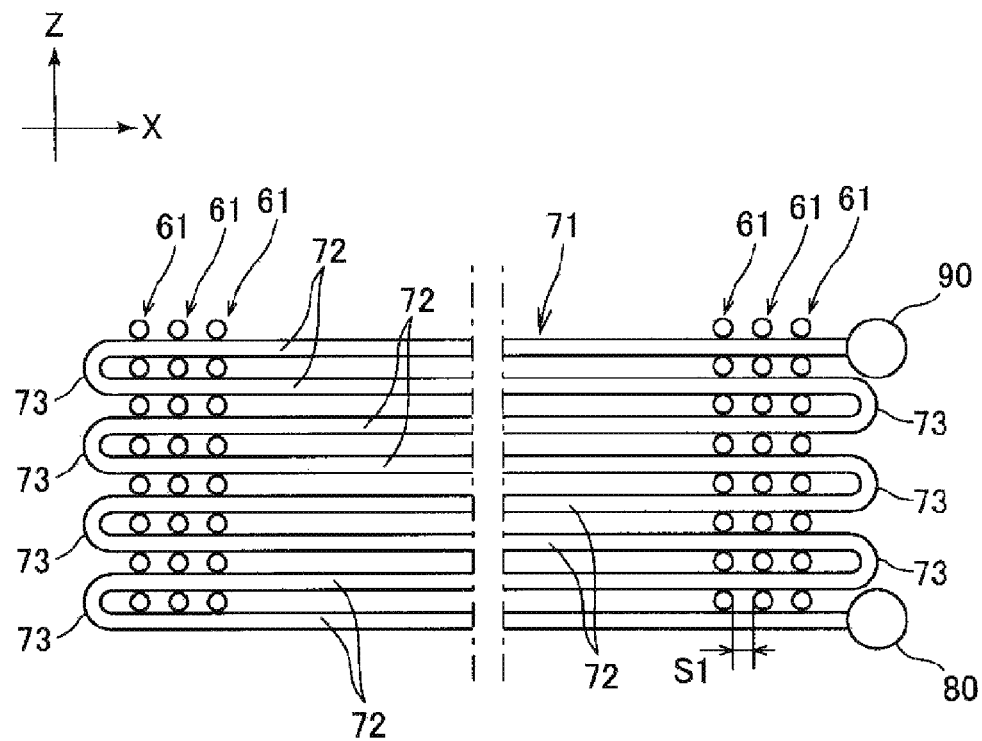
FIG. 3 is an explanatory drawing illustrating a section of the heat exchanger illustrated in FIG. 2, taken along a line A-A.
Figure 4:
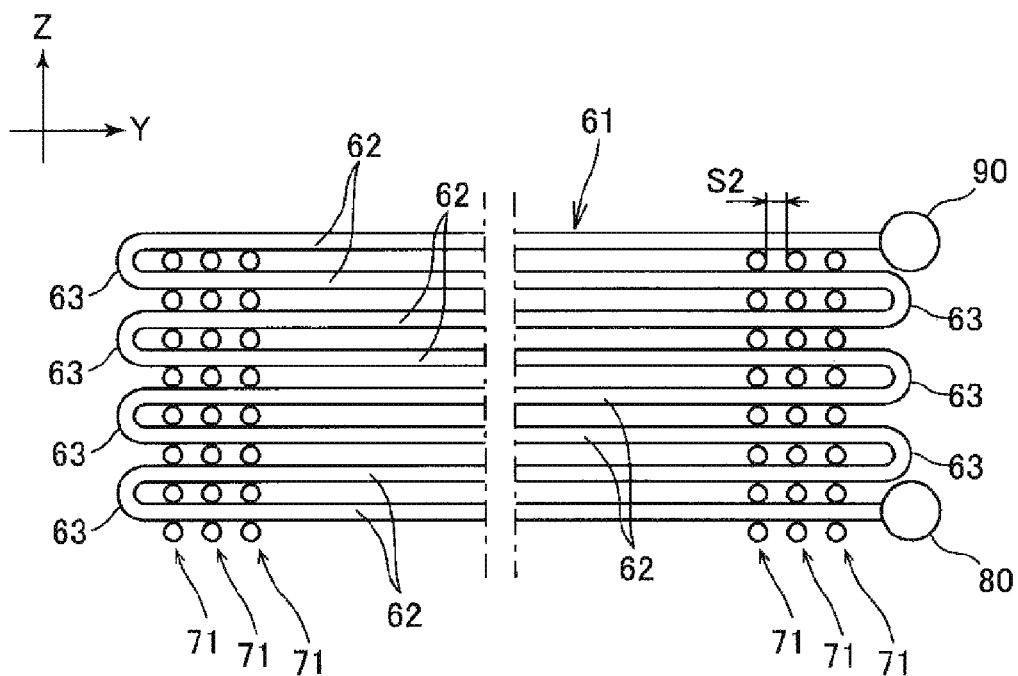
FIG. 4 is an explanatory drawing illustrating a section of the heat exchanger illustrated in FIG. 2, taken along a line B-B.
Figure 5:
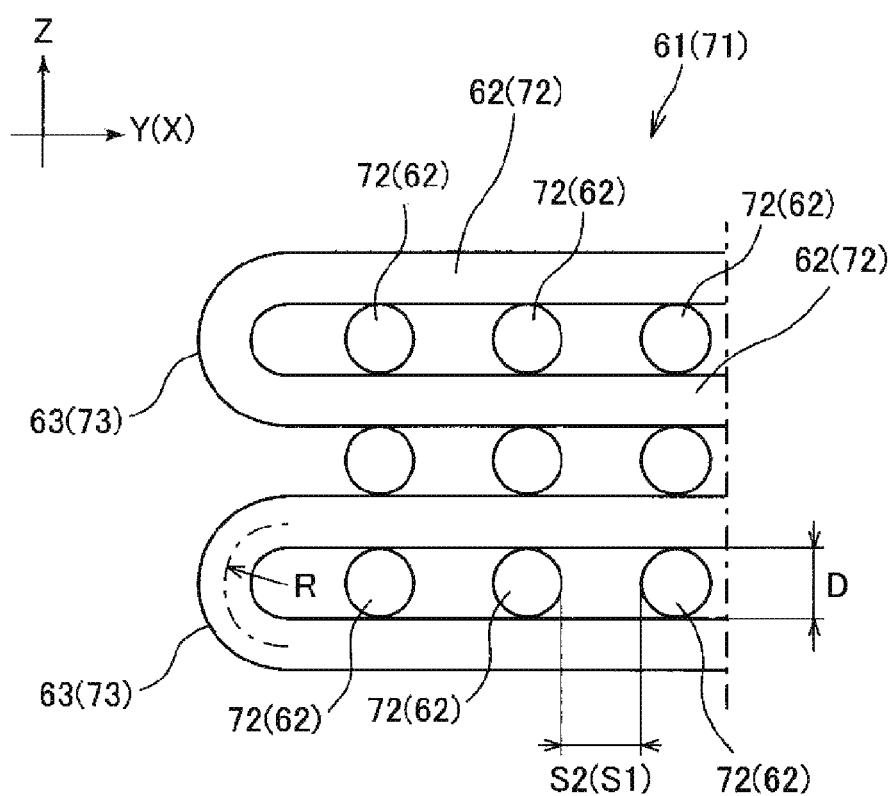
FIG. 5 is an explanatory drawing illustrating a main part of the heat exchanger in an enlarged fashion.

Hereinafter, a heat exchanger 50 according to an aspect of this embodiment will be described. Here, FIG. 2 is a plan view illustrating schematically the configuration of the heat exchanger 50 according to this embodiment. FIG. 3 is an explanatory drawing illustrating a section of the heat exchanger 50 illustrated in FIG. 2, taken along a line A-A. FIG. 4 is an explanatory drawing illustrating a section of the heat exchanger 50 illustrated in FIG. 2, taken along a line B-B. Additionally, FIG. 5 is an explanatory drawing illustrating a main part of the heat exchanger 50 in an enlarged fashion. In the description of the heat exchanger 50, of two right-angled directions defined within a horizontal plane, one direction will be referred to as an X-direction (a first direction) and the other direction will be referred to as a Y-direction (a second direction). In addition, an up-and-down direction (a vertical direction) will be referred to as a Z-direction.

The heat exchanger 50 transfers heat between a first fluid on a periphery of a heat transfer tube and a second fluid in an interior of the heat transfer tube. This heat exchanger 50 can be made use of as the regenerative heat exchanger 19, the condensing heat exchanger 20, the evaporative heat exchanger 21 and the absorption heat exchanger 22.

The heat exchanger 50 includes a first heat transfer tube unit 60 and a second heat transfer tube unit 70.

The first heat transfer tube unit 60 includes a plurality of first heat transfer tubes 61 arranged in parallel with one another in the X-direction. An inlet header 80, which is configured to supply a second fluid into the first heat transfer tubes 61, is connected to one end portion of each of the first heat transfer tubes 61, and an outlet header 90, where the second fluid flows out of the first heat transfer tubes 61, is connected to the other end portion of each of the first heat transfer tubes 61. These first heat transfer tubes 61 are arranged to be spaced apart from one another with a predetermined space S1 defined between them. This space S1 is set at an optimum value in advance so that a flow of vapor in the vertical direction is not interrupted and that a miniaturization of the heat exchanger 50 can be attained.

Each first heat transfer tube 61 includes n (n is a natural number of 2 or greater) first straight portions 62 and n−1 first curved portion or portions 63, and the first heat transfer tubes 61 form one flow path extending from the inlet header 80 to reach the outlet header 90. Heat transfer tubes of the same configuration are used for the plurality of first heat transfer tubes 61. Due to this, flow path lengths from the inlet header 80 to the outlet header 90 become the same on all the first heat transfer tubes 61.

The plurality of first straight portions 62 are arranged in parallel with and spaced from one another in the Z-direction. The outlet header 90 is connected to one end portion of an uppermost first straight portion 62, and the inlet header 80 is connected to one end portion of a lowermost first straight portion 62.

End portions of a pair of first straight portions 62 that lie adjacent to each other in the vertical direction are connected together by a first curved portion 63. Then, the first straight portions 62 that are arranged in parallel with one another in the vertical direction are caused to communicate sequentially with one another via first curved portions 63, whereby one flow path extending from the inlet header 80 to the outlet header 90 is formed. Namely, the first heat transfer tube 61 exhibits a shape in which the first straight portion 62 is folded into a multiplicity of stages via the first curved portions 63.

Additionally, the first straight portions 62 and the first curved portions 63 have the same outside diameter D, whereby the first heat transfer tube 61 extends continuously from the inlet header 80 to the outlet header 90 with the same outside diameter D.

On the other hand, the second heat transfer tube unit 70 includes a plurality of second heat transfer tubes 71 that are arranged in parallel with one another in the Y-direction. An inlet header 80, which is configured to supply a second fluid into the second heat transfer tubes 71, is connected to one end portion of each of the second heat transfer tubes 71, and an outlet header 90, where the second fluid flows out of the second heat transfer tubes 71, is connected to the other end portion of each of the second heat transfer tubes 71. These second heat transfer tubes 71 are arranged to be spaced apart from one another with a predetermined space S2 (for example, S2=S1) defined between them. This space S2 is set at an optimum value in advance so that a flow of vapor in the vertical direction is not interrupted and that a miniaturization of the heat exchanger 50 can be attained.

Each second heat transfer tube 71 includes m (m is a natural number of 2 or greater) second straight portions 72 and m−1 second curved portion or portions 73, and the second heat transfer tubes 71 form one flow path extending from the inlet header 80 to reach the outlet header 90. Heat transfer tubes of the same configuration are used for the plurality of second heat transfer tubes 71. Due to this, flow path lengths from the inlet header 80 to the outlet header 90 become the same on all the second heat transfer tubes 71.

The plurality of second straight portions 72 are arranged in parallel with and spaced from one another in the Z-direction. The outlet header 90 is connected to one end portion of an uppermost second straight portion 72, and the inlet header 80 is connected to one end portion of a lowermost second straight portion 72.

End portions of a pair of second straight portions 72 that lie adjacent to each other in the vertical direction are connected together by a second curved portion 73. Then, the second straight portions 72 that are arranged in parallel with one another in the vertical direction are caused to communicate sequentially with one another via second curved portions 73, whereby one flow path extending from the inlet header 80 to the outlet header 90 is formed. Namely, the second heat transfer tube 71 exhibits a shape in which the second straight portion 72 is folded into a multiplicity of stages via the second curved portions 73.

Additionally, the second straight portions 72 and the second curved portions 73 have the same outside diameter D, whereby the second heat transfer tube 71 extends continuously from the inlet header 80 to the outlet header 90 with the same outside diameter D. The outside diameter D of the second heat transfer tube 71 is set, for example, at an outside diameter that is the same as the outside diameter D of the first heat transfer tube 61.

In this embodiment, the first curved portion 63 has a semi-circular arc shape. A radius of curvature of the first curved portion 63 corresponds to the outside diameter D of the second straight portion 72. Similarly, the second curved portion 73 has a semi-circular arc shape. A radius of curvature R of the second curved portion 73 corresponds to the outside diameter D of the first straight portion 62. On the basis of these dimensions, the first straight portions 62 and the second straight portions 72, which are arranged to intersect each other, are stacked alternately together in the Z-direction with outer surfaces kept in touch with each other or kept slightly apart from each other.

In this embodiment, the plurality of first heat transfer tubes 61 and the plurality of second heat transfer tubes 71 are disposed so at to intersect each other at right angles. However, the first heat transfer tubes 61 and the second heat transfer tubes 71 may be disposed so as to intersect each other at any other angles than a right angle. Hereinafter, when the first heat transfer tubes 61 and the second heat transfer tubes 71 are referred to in general, they will be referred to simply as the heat transfer tubes 61, 71.

In the heat exchanger 50 configured in the way as described heretofore, the second fluid is supplied into the interiors of the pluralities of heat transfer tubes 61, 71 by way of the corresponding inlet headers 80. The second fluid flows into and through the interiors of both the heat transfer tubes 61, 71 by way of the corresponding inlet headers 80 and thereafter flows out into the corresponding outlet headers 90. Then, heat is transferred between the first fluid on the peripheries of the heat transfer tubes 61, 71 and the second fluid in the interiors of the heat transfer tubes 61, 71.

For example, when the heat exchanger 50 is applied to the regenerative heat exchanger 19 of the absorption refrigerator 1, thermal medium carrying pipes are connected to the inlet headers 80 and the outlet headers 90. The thermal medium flows into the interiors of the heat transfer tubes 61, 71, and the diluted solution is dripped on to the peripheries of the heat transfer tubes 61, 71 from the diluted solution distributors 16. The dripped diluted solution flows down the heat transfer tubes 61, 71 and transfers heat between the thermal medium and itself, whereby part of the refrigerant solution is evaporated.

When the heat exchanger 50 is applied to the condensing heat exchanger 20 of the absorption refrigerator 1, the cooling water piping 26 is connected to the inlet headers 80 and the outlet headers 90. The cooling water flows into the interiors of the heat transfer tubes 61, 71, and the refrigerant vapor is supplied to the peripheries of the heat transfer tubes 61, 71 from the generator 10. The refrigerant vapor supplied from the generator 10 condenses on the peripheries of the heat transfer tubes 61, 71, and the refrigerant solution resulting from condensation flows down.

Additionally, when the heat exchanger 50 is applied to the evaporative heat exchanger 21 of the absorption refrigerator 1, the chilled water piping 27 is connected to the inlet headers 80 and the outlet headers 90. The chilled water flows through the interiors of the heat transfer tubes 61, 71, and the refrigerant solution is dripped on to the peripheries of the heat transfer tubes 61, 71 from the refrigerant distributor 14. The dripped refrigerant solution flows down outer portions of the heat transfer tubes 61, 71 and transfers heat between the chilled water and itself, whereby part of the refrigerant solution is evaporated.

When the heat exchanger 50 is applied to the absorption heat exchanger 22 of the absorption refrigerator 1, the cooling water piping 26 is connected to the inlet headers 80 and the outlet headers 90. The cooling water flows through the interiors of the heat transfer tubes 61, 71, and the condensed solution is dripped on to the peripheries of the heat transfer tubes 61, 71 from the condensed solution distributor 15. The dripped condensed solution absorbs the refrigerant vapor while flowing down the outer portions of the heat transfer tubes 61, 71 and transfers heat between the cooling water and itself, whereby the absorbed heat is removed.

In this way, according to the heat exchanger 50 of this embodiment, the configuration is adopted in which not only are the heat transfer tubes 61, 71 in contact with each other in the vertical direction (the Z-direction), but also the heat transfer tubes 61, 71 intersect each other in a grid-like fashion, whereby the heat transfer tubes 61, 71 that intersect so are brought into contact with each other at a number of locations.

According to this configuration, the first fluid dripped on to the upper most heat transfer tubes 61, 71 moves down on to the heat transfer tubes 61, 71 that lie directly below the uppermost ones while intersecting each other. Then, the first fluid propagates further down onto the remaining heat transfer tubes 61, 71 in the same manner until the first fluid spreads over the whole of the heat transfer tubes 61, 71 to thereby maintain the wetting properties of the heat transfer tubes 61, 71. Thus, even in the event that the first fluid dripped on to the uppermost heat transfer tubes 61, 71 varies, the heat exchange performance can be maintained.

In addition, according to the configuration, the heat transfer tubes 61, 71 extend from the inlet headers 80 to the outlet headers 90 with the same diameters. This prevents an increase in the pressure loss occurring in the second fluid that flows through the interiors of the heat transfer tubes 61, 71, whereby an increase in the fluid carrying power becomes unnecessary. This can realize the conservation of energy. Additionally, a reduction in the machining cost of the heat transfer tubes 61, 71 (for example, a machining cost incurred in drawing header connecting portions of the transfer tubes 61, 71) can be realized.

According to the configuration described above, the lengths of the heat transfer tubes 61, 71 are the same. This allows the second fluid to flow through the heat transfer tubes 61, 71 uniformly.

According to the configuration described above, it is possible to construct an ideal counter-flow heat exchanger.

Further, according to the heat exchanger 50 of the embodiment, the intersecting heat transfer tubes 61, 71 are brought into contact with each other alternately. Further, the heat transfer tubes 61, 71 that are directed in the same direction are spaced apart from each other with the spaces S1, S2 ensured between them, respectively. This can ensure the flow of the fluid (the gaseous fluid) not only in the Z-direction but also in the horizontal directions (the X-direction and Y-direction), whereby the configuration can be provided which makes it difficult to interrupt the flow of the gaseous fluid.

In this way, according to the heat exchanger 50 of this embodiment, it is possible to realize the small and high-performance heat exchanger.

Thus, while the invention has been described by reference to the embodiment, the invention is not limited to the embodiment but may be modified without departing from the spirit and scope of the invention. The definition of the horizontal plane and the vertical direction made herein does not have to be followed strictly depending upon the environment where the heat exchanger is used.

For example, the heat exchanger of this embodiment is applied to the generator, the condenser, the evaporator and the absorber of the absorption refrigerator. However, the heat exchanger may be applied not only to all of the generator, the condenser, the evaporator and the absorber but also to at least one of them.

The heat exchanger is applied to the absorption refrigerator, but the invention is not limited thereto. As long as the absorption chiller has an absorption refrigerator function, the heat exchanger may be applied further to an absorption chiller-heater that can also perform a heating operation.

In this embodiment, although the heat exchanger 50 is described as being applied to the single-effect water-fired absorption refrigerator, the heat exchanger 50 may be applied to various absorption refrigerators including a double-effect absorption refrigerator and a double-lift absorption refrigerator. Additionally, although the heat exchanger 50 according to the embodiment is applied to the absorption refrigerator, the heat exchanger 50 may be used for any other various applications than the application described herein.

Additionally, the lengths of the first heat transfer tubes and the second heat transfer tubes do not have to be the same, and the numbers of the first heat transfer tubes and the second heat transfer tubes do not have to be fixed to the same number. In addition, the space at which the plurality of first heat transfer tubes are spaced apart does not have to be fixed to the same space (the space S1) over the plurality of first heat transfer tubes, and hence, the first heat transfer tubes may be spaced apart from one another at different spaces, as long as the spaces ensured do not interrupt the flow of the gaseous fluid. For example, two first heat transfer tubes are disposed near to or in contact with each other, and a plurality of such pairs of first heat transfer tubes may be disposed spaced apart from one another at a space (the space S1). Additionally, this will be true with the positional relationship among the second heat transfer tubes. Further, in the embodiment, the first heat transfer tube and the second heat transfer tube have the same outside diameter, however, the first heat transfer tube and the second heat transfer tube may have different outside diameters. As this occurs, the radius of curvature of the first curved portion and the radius of curvature of the second curved portion are set according to the outside diameters of the first and second heat transfer tubes, respectively.

The invention claimed is:

1. A heat exchanger configured to transfer heat between a first fluid on a periphery of a heat transfer tube and a second fluid in an interior of the heat transfer tube, the heat exchanger, comprising:
    a first heat transfer tube unit comprising a plurality of first heat transfer tubes arranged in parallel with one another along a first direction within a horizontal plane; and
    a second heat transfer tube unit comprising a plurality of second heat transfer tubes arranged in parallel with one another along a second direction that is substantially perpendicular to the first direction within the horizontal plane,
    wherein each of the plurality of first heat transfer tubes comprises:
        a plurality of first straight portions arranged in parallel with and spaced from one another in a vertical direction; and
        one or more first curved portions that make end portions of the first straight portions communicate with each other, and
    the plurality of first heat transfer tubes form one flow path from an inlet header 80 to an outlet header,
    wherein each of the plurality of second heat transfer tubes comprises:
        a plurality of second straight portions arranged in parallel with and spaced from one another in the vertical direction; and
        one or more second curved portions that make end portions of the second straight portions communicate with each other, and
    the plurality of second heat transfer tubes form one flow path from the inlet header to the outlet header, and
    wherein the first straight portions and the second straight portions are stacked on each other alternately.

2. The heat exchanger according to claim 1,
    wherein the plurality of first heat transfer tubes are arranged in parallel with and spaced from one another in the first direction, and
    wherein the plurality of second heat transfer tubes are arranged in parallel with and spaced from one another in the second direction.

3. The heat exchanger according to claim 1,
    wherein the one or more first curved portions have a radius of curvature corresponding to an outside diameter of the second straight portion, and
    wherein the one or more second curved portions have a radius of curvature corresponding to an outside diameter of the first curved portion.

4. An absorption refrigerator comprising:
    a generator configured to heat a diluted solution to generate a refrigerant vapor and a condensed solution;
    a condenser configured to condense the refrigerant vapor generated in the generator;
    an evaporator configured to receive a refrigerant solution condensed in the condenser and evaporate the refrigerant solution; and
    an absorber configured to make a refrigerant vapor generated by evaporation in the evaporator be absorbed into the condensed solution generated in the generator to generate the diluted solution,
    wherein the absorption refrigerator forms an absorption refrigerating cycle of sending the diluted solution generated in the absorber to the generator, and
    wherein the heat exchanger according to claim 1 is disposed in at least one of the generator, the condenser, the evaporator and the absorber.

* * * * *